United States Patent
Kojima (10) Patent No.: US 10,367,684 B2
(45) Date of Patent: Jul. 30, 2019

(54) FAULT DETECTION METHOD AND MOBILE WIRELESS SYSTEM

(71) Applicant: NEC Corporation, Minato-ku, Tokyo (JP)

(72) Inventor: Takashi Kojima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 219 days.

(21) Appl. No.: 15/309,905

(22) PCT Filed: May 14, 2015

(86) PCT No.: PCT/JP2015/002442
§ 371 (c)(1),
(2) Date: Nov. 9, 2016

(87) PCT Pub. No.: WO2015/177992
PCT Pub. Date: Nov. 26, 2015

(65) Prior Publication Data
US 2017/0149603 A1    May 25, 2017

(30) Foreign Application Priority Data

May 19, 2014 (JP) .................................. 2014-103152

(51) Int. Cl.
*H04L 12/24* (2006.01)
*B61L 3/12* (2006.01)
(Continued)

(52) U.S. Cl.
CPC ............ *H04L 41/0677* (2013.01); *B61L 3/12* (2013.01); *B61L 15/0027* (2013.01);
(Continued)

(58) Field of Classification Search
CPC ......................... H04L 41/0677; H04W 24/08
See application file for complete search history.

(56) References Cited

U.S. PATENT DOCUMENTS

| 2008/0042912 A1* | 2/2008 | Lee | ..................... H04L 12/4641 343/713 |
| 2011/0183605 A1* | 7/2011 | Smith, Jr. | ........... B61L 15/0027 455/7 |
| 2012/0000739 A1* | 1/2012 | Nogi | ........................ B60L 5/00 191/50 |

FOREIGN PATENT DOCUMENTS

| JP | H09-159716 A | 6/1997 |
| JP | 2001-138915 A | 5/2001 |

(Continued)

OTHER PUBLICATIONS

International Search Report for PCT Application No. PCT/JP2015/002442, dated Jun. 9, 2015.

(Continued)

*Primary Examiner* — Zhiren Qin (57) ABSTRACT

A method in which a base station installed in each of a plurality of sections of a route, an antenna which is connected to the base station and installed along the route, and a control device which controls all the base stations installed along the route are used includes: measuring a strength of a signal emitted from the antenna in at least one mobile body in operation; acquiring a temporary failure determination result based on the signal strength, transmitting announcement information by the control device via the base station and the antenna to which it is determined that a failure occurs when the temporary failure determination result is acquired, transmitting an answer to the control device by an arbitrary mobile body in operation and receives the announcement information, and making a final failure determination based on the answer transmitted from each mobile body in the control device.

20 Claims, 8 Drawing Sheets

(51) Int. Cl.
- *B61L 15/00* (2006.01)
- *B61L 27/00* (2006.01)
- *H04W 24/08* (2009.01)
- *H04W 24/10* (2009.01)
- *H04B 5/00* (2006.01)
- *H04W 4/02* (2018.01)
- *H04B 17/17* (2015.01)
- *H04B 17/26* (2015.01)
- *H04B 17/318* (2015.01)
- *H04W 88/08* (2009.01)
- *H04W 4/04* (2009.01)
- *H04W 24/04* (2009.01)

(52) U.S. Cl.
CPC ....... *B61L 15/0081* (2013.01); *B61L 27/0005* (2013.01); *B61L 27/0038* (2013.01); *B61L 27/0088* (2013.01); *H04B 5/0018* (2013.01); *H04B 17/17* (2015.01); *H04B 17/26* (2015.01); *H04B 17/318* (2015.01); *H04W 4/02* (2013.01); *H04W 24/08* (2013.01); *H04W 24/10* (2013.01); *B61L 2205/00* (2013.01); *H04W 4/046* (2013.01); *H04W 24/04* (2013.01); *H04W 88/08* (2013.01)

(56) References Cited

FOREIGN PATENT DOCUMENTS

| | | |
|---|---|---|
| JP | 2012-160806 A | 8/2012 |
| JP | 2012-178779 A | 9/2012 |

OTHER PUBLICATIONS

English translation of Written opinion for PCT Application No. PCT/JP2015/002442.

* cited by examiner

FAULT DETECTION METHOD AND MOBILE WIRELESS SYSTEM

This application is a National Stage Entry of PCT/JP2015/002442 filed on May 14, 2015, which claims priority from Japanese Patent Application 2014-103152 filed on May 19, 2014, the contents of all of which are incorporated herein by reference, in their entirety.

TECHNICAL FIELD

The present invention relates to a technology for detecting a failure or a fault in a wireless facility. In particular, the present invention relates to a fault detection method for identifying a fault location in a wireless facility which performs wireless communication with a mobile body such as a vehicle or the like, a mobile wireless communication system which can perform the fault detection method, and an in-vehicle device and a control device of which such mobile wireless system is composed.

BACKGROUND ART

In order to enable wireless communication between a train which travels on a railroad track and a ground facility (for example, an operation command room), a train radio system which is one kind of a mobile communication system is provided. The railroad track can be regarded as one line (in a case in which it is required to distinguish two lines in both directions in a double track section, two closed lines) when it is seen in broad perspective. Accordingly, a service area of the train radio system is an area along such line. Therefore, in a common train radio system, a long antenna such as a leaky coaxial cable (LCX) or the like is installed near the railroad track and along the railroad track and a base station is connected to this antenna. On the other hand, in a common train radio system, the in-vehicle device is installed in a train. In the train radio system using the LCX, a radio wave leaked from the LCX installed along the railroad track is received by a train side device (in-vehicle device) and whereby, communicate between the ground facility and a train can be performed. The LCX is also used as countermeasures against a dead zone such as a tunnel in which mobile telephone service cannot be offered because a radio wave does not reach. Further, when a layout of the railroad track is determined from a geographical viewpoint, the service area of the train radio system may be spread in a planar shape.

A mobile communication system similar to the train radio system used for a railroad or a track can also be applied to for example, bus transit (as an example, a BRT (Bus Rapid Transit) system) or the like that uses an exclusive road or an open road. Accordingly, in this description, the railroad track of the railroad or the track, a ropeway, a guide rail, a road, and the like are called as a route. In this kind of the mobile communication system, when the length of the route is long, base stations are deployed at an interval of several kilometers along the route, the LCX is connected to all the base stations, and a plurality of base stations are connected to a central control device by a wire cable. The mobile communication system is configured in such a way that the central control device controls a plurality of the base stations. In a case in which the interval between the base stations is greater than the length of one LCX, a plurality of the LCXs are laid along the route and each LCX is connected to the base station by a relay cable.

In order to stably operate the mobile communication system represented by the train radio system, it is required to quickly detect the occurrence of failure or fault in the LCX and the base station connected to the LCX and identify the fault location. However, in order to detect a failure or a fault in these devices and identify a fault location, in general, it is required to perform an on-site investigation and it takes a huge cost and a very long time. In PTL (patent literature) 1, it is disclosed a method for detecting a position of a crack, a fracture, or the like in an early stage of the LCX with a high degree of accuracy in which a detection sensor composed of a loop antenna is moved along the LCX and the fault location is detected based on the leaked electromagnetic field strength.

As a method for detecting a position of each train on a route, for example, in patent literature 2, it is disclosed a method in which the position of the train is detected by a train side device by using the GPS (Global Positioning System) and a modulation scheme of the train radio system is changed according to the detected position.

CITATION LIST

Patent Literature

[PTL 1] Japanese Patent Application Laid-Open No. 1997-159716
[PTL 2] Japanese Patent Application Laid-Open No. 2012-160806

SUMMARY OF INVENTION

Technical Problem

As mentioned above, in the mobile communication system including the wireless facility composed of antennas installed along the route and a plurality of base stations, it is required to perform the on-site investigation in order to detect a failure or a fault in the wireless facility on the ground and identify a fault location. For this reason, there is a problem in which it takes a huge cost and a very long time to identify the fault location. Further, when the mobile communication system is the train radio system or the like, in order to keep an investigator safe, the train has to be stopped before performing the on-site investigation. Therefore, an additional cost and an additional time are necessary to identify the fault location.

An object of the present invention is to provide a method for detecting a failure or a fault in a wireless facility and identifying a fault location in which a failure determination is made during the operation of the wireless facility while maintaining the operation of the mobile body on the route without performing an on-site investigation by an investigator at all the places at which the wireless facilities are located.

Solution to Problem

A fault detection method of the present invention is a method for detecting a failure location in a wireless facility which performs wireless communication with a mobile body which travels on a route in which a base station installed in each of a plurality of sections of the route, an antenna which is connected to the base station and installed along the route, and a control device which controls all the base stations installed along the route are used, the method including: measuring a strength of a signal emitted from the antenna in at least one mobile body in operation; acquiring a temporary failure determination result based on the signal strength, transmitting announcement information by the control device via the base station and the antenna to which it is determined that a failure occurs when the temporary failure determination result is acquired, transmitting an answer to the control device by the arbitrary mobile body in operation and receives the announcement information, and making a final failure determination by the control device based on the answer transmitted from each mobile body.

A mobile communication system of the present invention is a mobile communication system which performs wireless communication with a mobile body which travels on a route and includes a ground facility composed of a base station installed in each of a plurality of sections of the route, an antenna which is connected to the base station and installed along the route, and a control device which controls all the base stations installed along the route and an in-vehicle device installed in the mobile body wherein the in-vehicle device includes a control unit which measures a strength of a signal emitted from the antenna, makes a temporary failure determination based on the strength of the signal, and transmits a temporary failure determination result to the control device and when the control device receives the temporary failure determination result, the control device transmits announcement information via the base station and the antenna to which it is determined that a failure occurs and makes a final failure determination based on an answer transmitted from each mobile body.

An in-vehicle device of the present invention is an in-vehicle device which is installed in a mobile body which travels on a route and performs wireless communication with a ground facility including a base station installed in each of a plurality of sections of the route, an antenna which is connected to the base station and installed along the route, and a control device which controls all the base stations installed along the route, includes a strength measurement block for measuring a strength of a signal emitted from the antenna during the operation of the mobile body, a temporary failure determination block for making a temporary failure determination based on the strength of the signal and transmitting a temporary failure determination result to the control device, and an announcement information transmission block for transmitting an answer to the announcement information to the control device when the announcement information is received via the base station and the antenna.

A control device of the present invention is a control device installed in a mobile communication system which includes a base station installed in each of a plurality of sections of a route and an antenna which is connected to the base station and installed along the route and performs wireless communication with a mobile body which travels on the route, includes a base station control unit for controlling all the base stations installed along the route, an announcement information transmission unit for transmitting announcement information via the base station and the antenna to which it is determined that a failure occurs when it is determined that at least one of the base station and the antenna connected to the base station is failed based on a temporary failure determination result received from the mobile body, and a final failure determination unit for making a final failure determination based on the answer to the announcement information transmitted from each mobile body.

Advantageous Effects of Invention

By using the present invention, a failure or a fault in a wireless facility can be detected and a fault location can be identified by using for example, a mobile body in service without stopping the operation of the mobile body.

DESCRIPTION OF EMBODIMENTS

Next, a desirable example embodiment of the present invention will be described with reference to a drawing.

First Example Embodiment

Figure 1A:
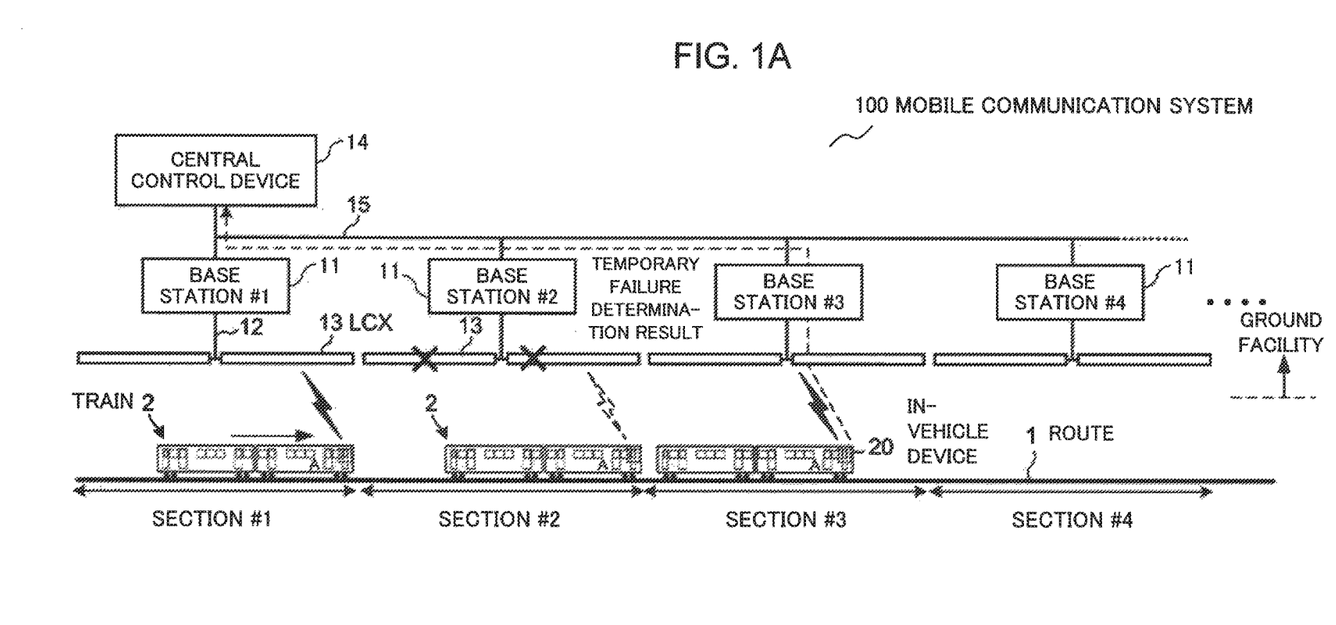
FIG. 1A is a figure illustrating a mobile communication system according to a first example embodiment of the present invention.
Figure 1B:
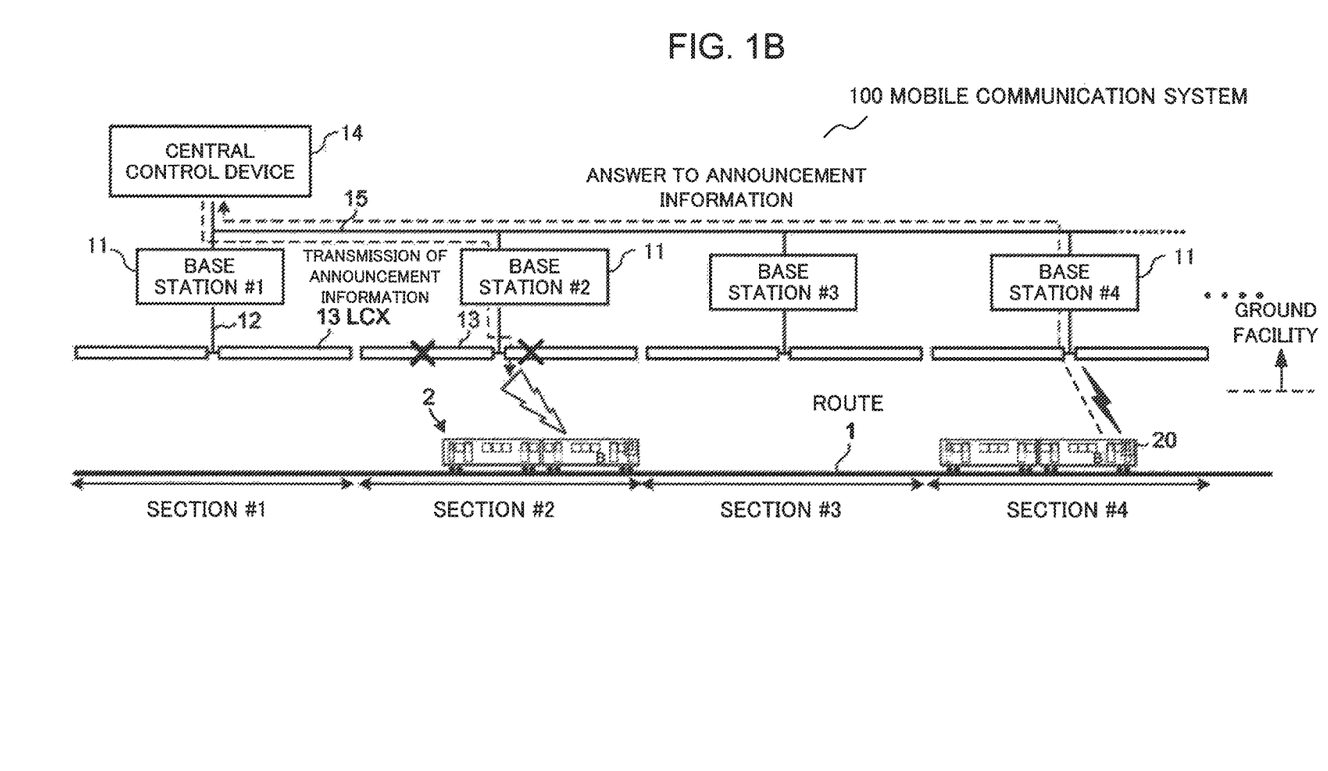
FIG. 1B is a figure illustrating a mobile communication system according to a first example embodiment of the present invention.

FIG. 1A and FIG. 1B illustrate a mobile communication system according to a first example embodiment of the present invention and show a configuration of a mobile communication system 100 according to the first example embodiment. Further, FIG. 1A shows the operation of a temporary failure determination described later and FIG. 1B shows the operation of a final failure determination. Here, a route 1 represents a railroad and for example, a train 2 travels on the railroad track of the route 1 according to a predetermined train operation schedule (in other words, a train operation diagram) and wireless communication is performed with the train 2 on the route 1. Accordingly, the mobile communication system 100 is configured as a train radio system in which the mobile body is a train. Of course, the mobile communication system 100 can be configured as another system other than the train radio system in which the mobile body is a train traveling on the railroad tracks. For example, this mobile communication system can be applied to a radio system in which the mobile body is a bus traveling on an exclusive road.

The route 1 is composed of several consecutive sections. In FIG. 1, these sections are shown as sections #1 to #4. A base station 11 is installed for each section and each base station 11 is connected to a leaky coaxial cable (LCX) 13 via a coaxial cable 12. In FIG. 1, base stations #1 to #4 are installed in the sections #1 to #4, respectively. The LCX 13 functions as an antenna which transmits/receives a radio wave to/from the train 2 that is the mobile body. The LCX 13 is laid along the route 1 for each section. A central control device 14 is installed at one site as a control device which controls all the plurality of the base stations 11. Each base station 11 is connected to the central control device 14 by a signal cable 15. The base station 11, the LCX 13, the central control device 14, and the like constitute a ground facility in this mobile communication system.

On the other hand, an in-vehicle device 20 which transmits/receives information to/from the ground facility by a radio wave is installed in the train 2. The in-vehicle device 20 is also called an in-vehicle station and for example, it is installed for each cab of a train. When the configuration of cars of the train is fixed, one set of the in-vehicle device 20 may be installed in one train unit. The ground facility and the in-vehicle device are called as the wireless facility. In particular, the mobile communication system 100 is configured in such a way as to detect the occurrence of failure or fault in the ground facility and easily identify the fault location.

Next, a temporary failure determination process and a final failure determination process in the mobile communication system 100 according to the first example embodiment will be described. In the first example embodiment, the temporary failure determination is made based on a signal strength measured in at least one mobile body in operation. From a result of the temporary failure determination, when it is expected that a failure occurs, announcement information is transmitted via the base station and the antenna of the base station to which it is expected that a failure occurs. By tallying the answers transmitted by the mobile bodies in operation that received the announcement information, the final failure determination is made.

The temporary failure determination process will be described by using FIG. 1A. When the mobile communication system 100 is operated, a strength of the signal emitted from the LCX 13 is continuously measured in the in-vehicle device 20 of at least one train 2 in operation. The strength of the signal emitted from the LCX 13 is for example, an electric field strength of a carrier wave signal from the LCX 13. The occurrence of failure in the specific base station 11 or the occurrence of failure in the LCX 13 connected to the specific base station 11 is detected based on a measurement result of the strength of the signal emitted from the LCX 13. When the occurrence of failure is detected, an expected failure location, in other words, a location to which it is determined that the failure occurs based on the result of the temporary failure determination is identified and information about the expected failure location is transmitted to the central control device 14 as a notification of the temporary failure determination result. As described above, the temporary failure determination process is performed. For example, a case in which when the train 2 is in operation, the failure in the base station 11 or the failure in the LCX 13 connected to the base station 11 occurs in a specific section (in an example shown in FIG. 1A, the section #2) and whereby, the signal from the LCX 13 cannot be normally received by the train 2 will be considered. In this case, when the decrease in the received signal strength is detected by the in-vehicle device 20 of the train 2, a fault location can be identified if a current location of the train 2 can be identified. The identification of the fault location is to identify the base station 11 or the LCX 13 in which the failure occurs. Because it is expected that very small number of the base stations among a plurality of the base stations 11 installed along the route 1 relate to the failure, for example, while the train 2 is travelling, the in-vehicle device 20 notifies a central processing device 14 of the temporary failure determination result via the base station in the next section (in an example shown in the figure, the section #3) that is adjacent to the current section in which the faulty base station 11 exists.

By the way, in general, the LCX 13 is installed in an environment such as an outdoor, the inside of a tunnel, or the like. Therefore, there is a possibility that the strength of the signal received by a train 2 side decreases by a factor other than the failure in the base station 11 or the LCX 13. Accordingly, it cannot be concluded that the failure occurs in the base station 11 or the LCX 13 by using only the temporary failure determination result. Therefore, in the mobile communication system according to this example embodiment, when it is expected that the failure occurs in the base station 11 or the LCX 13 from the result of the temporary failure determination, the final failure determination is made to determine whether the failure certainly occurred. Namely, in this example embodiment, the failure determination is made by using a multi-stage determination method in which the temporary failure determination and the final failure determination performed according to the temporary failure determination result are made. By using the multi-stage determination method, even when the mobile body travels at high speed, a failure and a fault in the wireless facility can be certainly detected.

When the temporary failure determination result is received by the central control device 14, the central control device 14 starts to make the final failure determination. When it is expected from the temporary failure determination result that the failure occurs in base station 11 or the LCX 13, as shown in FIG. 1B, the central control device 14 transmits the announcement information via the base station 11 and the LCX 13 to which it is expected that the failure occurs (in an example shown in FIG. 1B, the base station and the LCX in the section #2). If the failure does not occur in the base station 11 and the LCX 13 actually, the announcement information should be received by the in-vehicle device 20 of the train 2 which travels on the route 1. Accordingly, when the in-vehicle device 20 of each train 2 in operation receives the announcement information, it transmits an answer in response to the reception of the announcement information to the central control device 14.

For example, when the train is operated according to the predetermined train operation schedule and a plurality of trains travel in the section in which the base station or the LCX to which it is expected that the failure occurs is installed in a certain time period, if a wireless equipment normally operates actually and a factor such as a propagation failure or the like other than a failure in the wireless equipment is not considered, the central control device 14 receives the answers whose number corresponds to the number of the trains 2 in operation. Further, when the base station 11 normally operates but the failure occurs in the LCX 13, only a part of the announcement information is received by the in-vehicle device 20 of the train 2 in the section in which the LCX 13 to which it is expected that the failure occurs is installed. Therefore, it is expected that the number of the answers received from the train 2 decreases. Accordingly, the central control device 14 determines whether or not the failure actually occurs based on the answers received from the train 2, for example, based on the number of the answers indicating the normal reception of the announcement information.

Figure 2:
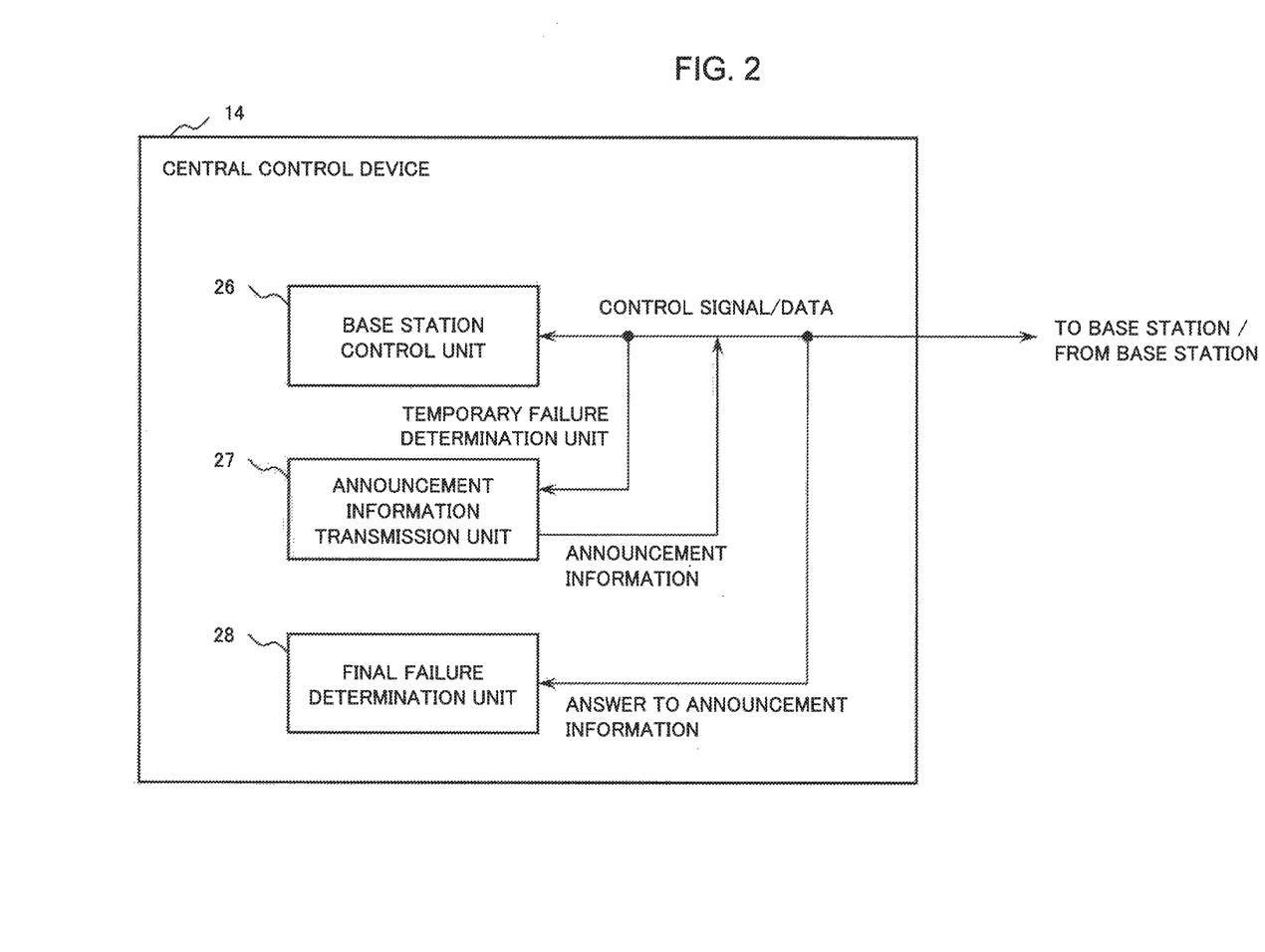
FIG. 2 is a block diagram showing an example of a configuration of a central control device.

FIG. 2 shows an example of a configuration of the central control device 14 used in such mobile communication system. As described above, the central control device 14 controls all the plurality of the base stations 11 installed along the route 1. When it is expected from the temporary failure determination result that the failure occurs, the central control device 14 transmits the announcement information via the base station 11 and the LCX 13 to which it is expected that the failure occurs. The central control device 14 tallies the answers received from the train 2 and makes the final failure determination based on the number of the answers indicating the normal reception of the announcement information. For this purpose, the central processing device 14 includes a base station control unit 26, an announcement information transmission unit 27, and a final failure determination unit 28. The base station control unit 26 transmits/receives a control signal and data to/from each of the base stations 11 and controls these base stations 11. When the announcement information transmission unit 27 receives the temporary failure determination result from the base station 11 and it is expected from the temporary failure determination result that the failure occurs, the announcement information transmission unit 27 transmits the announcement information via the base station 11 and the LCX 13 to which it is expected that the failure occurs. The final failure determination unit 28 receives the answer to the announcement information from the train 2, tallies the answers, and makes the final failure determination based on the number of the answers indicating the normal reception of the announcement information. The central processing device 14 may be realized by dedicated hardware. Alternatively, the central processing device 14 uses a general-purpose computer for control, a program which causes this computer to function as the base station control unit 26, the announcement information transmission unit 27, and the final failure determination unit 28 is read and stored in this computer, and the program is executed. Whereby, the central processing device 14 can also be realized.

Figure 3:
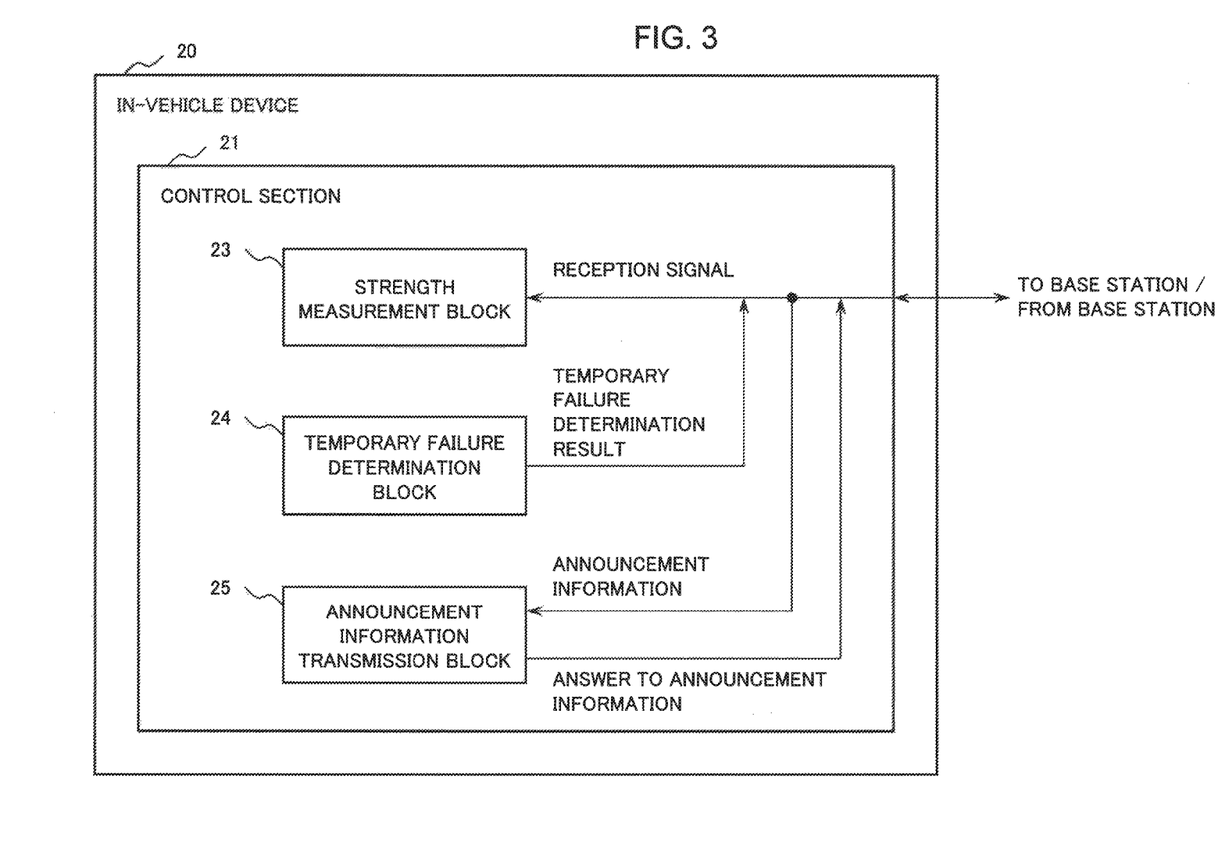
FIG. 3 is a block diagram showing an example of a configuration of an in-vehicle device.

FIG. 3 shows an example of a configuration of the in-vehicle device 20 used in the mobile communication system mentioned above. The in-vehicle device 20 includes a high-frequency circuit and a modulation circuit that are well-known in order to perform communication with the LCX 13 by a radio wave. The in-vehicle device 20 further includes a control section 21. The control section 21 performs control in such a way as to measure the strength of the signal emitted from the LCX 13 during the operation of the train 2, make the temporary failure determination based on this measurement result, transmit the determination result to the central control device 14, and transmit the answer to the announcement information when the announcement information is received. The control section 21 includes a strength measurement block 23, a temporary failure determination block 24, and an announcement information transmission block 25. The strength measurement block 23 measures the strength of the signal received from the base station via the LCX 13. The temporary failure determination block 24 makes the temporary failure determination based on the measured signal strength and transmits the temporary failure determination result to the central control device 14. The announcement information transmission block 25 receives the announcement information and transmits the answer to this announcement information. The control section 21 may be realized by dedicated hardware. Alternatively, the control section 21 uses a general-purpose computer for control, a program which causes this computer to function as the strength measurement block 23, the temporary failure determination block 24, and the announcement information transmission block 25 is read and stored in this computer, and the program is executed. Whereby, the control section 21 can also be realized.

In the above-mentioned example, the LCX is used as the antenna installed in the base station and communication using a space electromagnetic wave is performed. However, as a modification example, by using an inductive wire composed of a twin-lead type wire line as the antenna, communicate can be performed by an inductive radio system.

Figure 4:
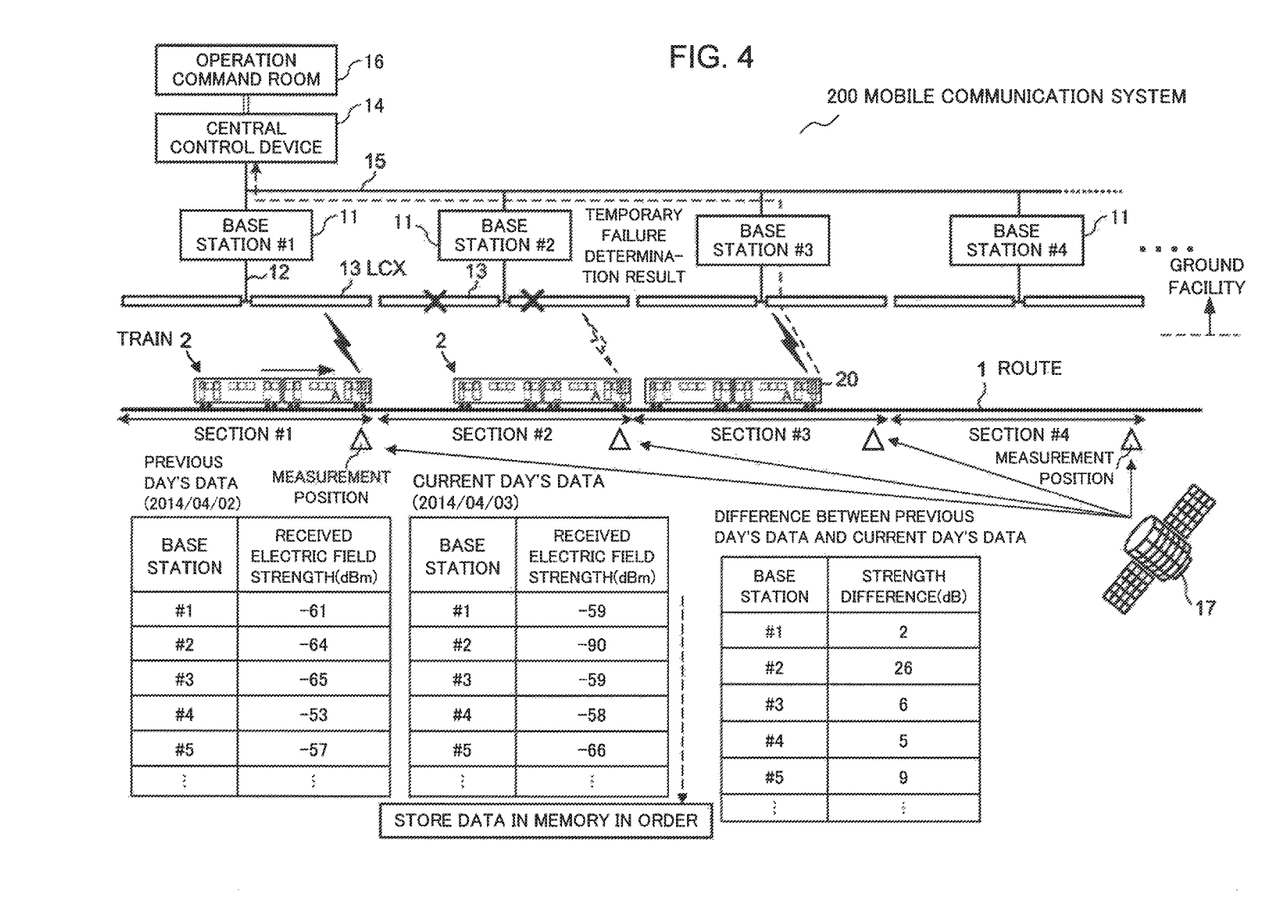
FIG. 4 is a figure showing a mobile communication system according to a second example embodiment of the present invention.

Next, a second example embodiment of the present invention will be described by using FIG. 4. FIG. 4 shows a configuration of a mobile communication system 200 according to the second example embodiment and also shows the operation when the temporary failure determination is made. The operation when the final failure determination is made in the mobile communication system 200 is similar to the operation shown in FIG. 1B. Therefore, it is not shown in FIG. 4.

In the mobile communication system 100 according to the first example embodiment, when the temporary failure determination is made, it is determined that a failure occurs by detecting the decrease in the received signal strength. However, in the mobile communication system in which the LCX 13 is used as the antenna, the received signal strength varies according to the length of the LCX 13, the distance between the base station 11 and a reception position, a surrounding environment, or the like even when the failure does not occur. Further, in order to identify the fault location, information about a correct position of the train 2 at the time of temporary failure determination is required. However, in the actual operation of the train, in general, the train's speed varies at each point along the route 1 and a manner of the speed change of the train is also slightly different from the other according to the train operation schedule. For this reason, even when the correct time at which the measurement is performed is obtained, the correct position of the train 2 cannot be determined.

Basically, a mobile communication system 200 according to the second example embodiment shown in FIG. 4 has a configuration similar to that of the mobile communication system 100 shown in FIG. 1. However, in the mobile communication system 200 according to the second example embodiment, in the temporary failure determination, the signal strength measured in the past is compared with the signal strength measured at this time for each measurement position. When the difference between both the measured values is equal to or greater than a predetermined threshold value, it is determined that a failure might has been occurred. When such temporary failure determination method is used, if the measurement position at which the signal strength is measured in the past differs from the measurement position at which the signal strength is measured at this time, the correct determination result cannot be obtained. Therefore, it is desirable to measure the correct position at which the train 2 travels. Accordingly, in the second example embodiment, when the temporary failure determination is made, the strength of the signal is measured at a predetermined position (a measurement position) based on the position of the train 2 determined by using the satellite positioning system. In FIG. 4, by receiving the radio wave from a GPS satellite 17 that is a positioning satellite, the position of the train 2 is determined and the strength of the signal is measured at one position that is determined for each section in advance. Of course, a plurality of measurement positions can be set in one section. In a case of a failure of only the LCX 13, when many measurement positions are used, the fault location can be precisely identified. Even when the signal strength is measured at one position in one section, if the signal strength is measured at the position near the end point of the section, the failure can be surely detected when the failure occurs in one of the base station 11 and the LCX 13 in the section.

In this example embodiment, the signal strength measured in the past is, for example, the signal strength measured on the previous day (in FIG. 4, shown as "previous day's data (2014/04/02)") and stored in a memory of the in-vehicle device 20 as a past measurement result. The signal strength measured at this time is the current signal strength that is measured during the current operation of the train 2 (in FIG. 4, shown as "current day's data (2014/04/03)"). The current measurement data obtained during the operation of the train 2 is stored in the memory in order. As shown in FIG. 4, the difference between the previous day's data and the current day's data is calculated. When the absolute value of the difference between the signal strength values is greater than the predetermined threshold value, in the temporary failure determination, it is determined that a failure occurs in the base station or the LCX located at the measurement position concerned. In FIG. 4, the difference between the values of the received electric field strength that are measured on the previous day and the current day at the measurement position related to the base station #2 installed in the section #2 is 26 dB. From this data, it is expected that the failure occurs in the base station #2 or the LCX connected to the base station #2. Thus, by comparing the previous day's measurement result with the current day's measurement result, the temporary failure determination can be certainly made during the daily train operation.

In the mobile communication system 200 shown in FIG. 4, the central control device 14 is operated from an operation command room 16 by an operation commander, who manages the train operation, or by a facility commander, who oversees a railroad facility. Further, the result of the final failure determination is transmitted from the central control device 14 to the operation command room 16.

Figure 5:
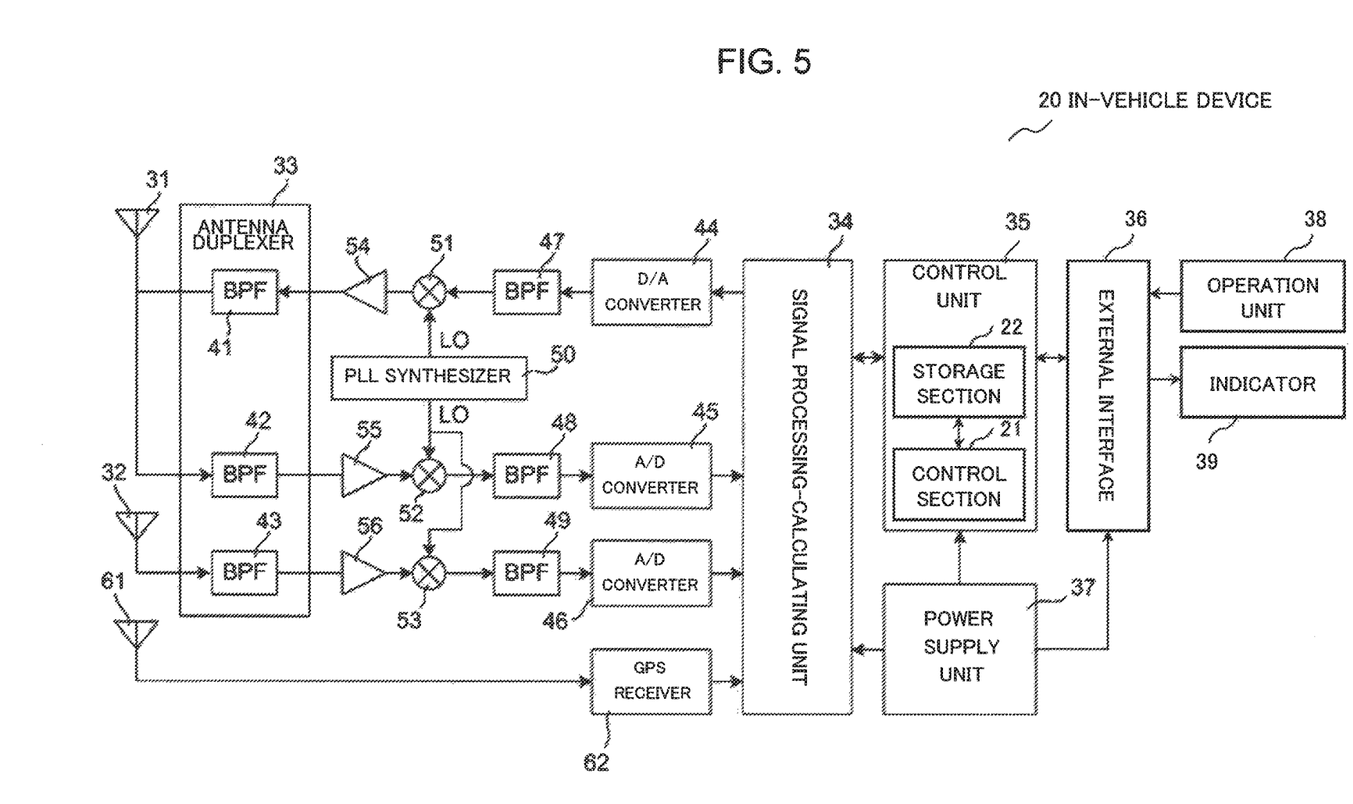
FIG. 5 is a block diagram showing an example of a configuration of an in-vehicle device used in a mobile communication system according to a second example embodiment.

FIG. 5 shows an example of a configuration of the in-vehicle device 20 used in the mobile communication system shown in FIG. 4. The in-vehicle device 20 includes two antennas 31 and 32, an antenna duplexer 33, a signal processing-calculating unit 34, a control unit 35, an external interface 36, a power supply unit 37, an operation unit 38, and an indicator 39. The antennas 31 and 32 are used for wireless communication with the ground facility. The antenna duplexer 33 is used for sharing the antennas 31 and 32. The signal processing-calculating unit 34 performs a baseband process of a signal. The control unit 35 controls the entire in-vehicle device 20. The power supply unit 37 supplies the electric power to the entire in-vehicle device 20. A crew operates the in-vehicle device 20 by using the operation unit 38 and the indicator 39. Even when only one set of in-vehicle device 20 is installed in the train unit, the operation unit 38 and the indicator 39 are installed in each of the cabs in the train unit. The operation unit 38 and the indicator 39 are connected to the control unit 35 via the external interface 36. For example, the signal processing-calculating unit 34 is composed of an FPGA (Field Programmable Gate Array).

Two antennas 31 and 32 function as a diversity antenna. The antenna 31 is used for transmitting and receiving the signal and the antenna 32 is used for receiving the signal. The antenna duplexer 33 includes bandpass filters (BPFs) 41 to 43. The bandpass filter 41 is connected to the antenna 31 and only the signal having a transmission frequency passes through the bandpass filter 41. The bandpass filter 42 is connected to the antenna 31 and only the signal having a reception frequency passes through the bandpass filter 42. The bandpass filter 43 is connected to the antenna 32 and the signal having a reception frequency passes through the bandpass filter 43.

A digital/analog (D/A) converter 44, analog/digital (A/D) converters 45 and 46, bandpass filters 47 to 49, a PLL (Phase Locked Loop) synthesizer 50, mixers 51 to 53, a power amplifier (PA) 54, and low noise amplifiers (LNAs) 55 and 56 are installed between the antenna duplexer 33 and the signal processing-calculating unit 34. A local oscillation (LO) frequency for transmission is supplied from the PLL synthesizer to the mixer 51. A local oscillation frequency for reception is supplied from the PLL synthesizer to the mixers 52 and 53. When the signal is transmitted from the in-vehicle device to the ground facility, a digital signal for transmission generated by the signal processing-calculating unit 34 is converted into an analog signal by the digital/analog converter 44. This analog signal is supplied to the mixer 51 via the bandpass filter 47 and converted into a transmission signal that is a signal having the transmission frequency. After the transmission signal is amplified by the power amplifier 54, it is supplied to the antenna 31 via the bandpass filter 41 and transmitted to a ground facility side. On the other hand, the signal transmitted from the ground facility is received by the antennas 31 and 32. The reception signals from the antennas 31 and 32 pass through the bandpass filters 42 and 43, are amplified by the low noise amplifiers 55 and 56, and are frequency-converted by the mixers 52 and 53, respectively. The frequency converted signals pass through the bandpass filters 48 and 49, are supplied to the A/D converters 45 and 46, and converted into the digital signal, respectively. The digital signals outputted from the A/D converters 45 and 46 are supplied to the signal processing-calculating unit 34.

Further, in order to precisely determine the position of the train 2 by using the satellite positioning system, the in-vehicle device 20 includes an antenna 61 which receives a radio wave from the GPS satellite and a GPS receiver 62 which is connected to the antenna 61 and performs the positioning calculation by using the GPS signal. The current position of the train 2 that is determined by the GPS receiver 62 is transmitted to the signal processing-calculating unit 34.

The control unit 35 includes the control section 21 for actually performing a control process and a storage section 22 for storing data required for the control. The control section 21 has a configuration similar to that of the control section in the in-vehicle device shown in FIG. 3. For example, the storage section 22 is composed of various memories such as a flash memory, a random access memory, an eMMC (embedded Multi Media Card), and the like. The storage section 22 holds the previous day's data and is also used as a memory which stores the current day's data in order.

Next, the operation of the mobile wireless system according to this example embodiment will be described. This mobile wireless system is characterized by detecting a failure by using a multi-stage determination method in which the temporary failure determination and the final failure determination are made and identifying a fault location. Accordingly, by explaining the temporary failure determination process and the final failure determination process, the operation of this mobile wireless system will be explained.

Figure 6:
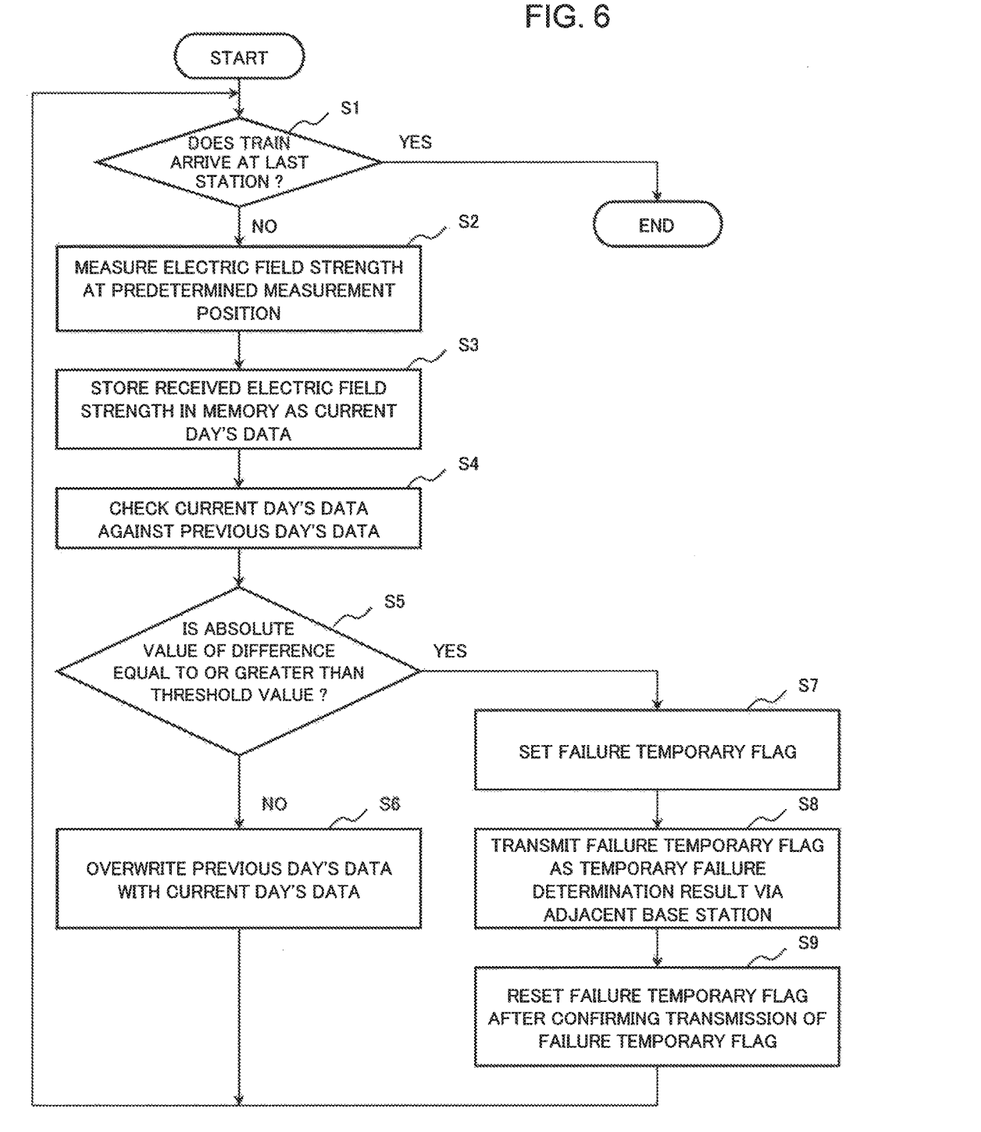
FIG. 6 is a flowchart explaining a process in an in-vehicle device.

The temporary failure determination process will be described by using FIG. 6. FIG. 6 is a flowchart showing the temporary failure determination process performed by the control section 21 of the in-vehicle device 20. Because the temporary failure determination process is performed when the train 2 is operated, first, in step S1, the control section 21 determines whether the train 2 arrives at the last station. When the train 2 has arrived at the last station, the process ends. Because the train 2 is in operation when the train 2 has not arrived the last station, in step S2, the control section 21 receives the radio wave outputted from each of the base stations 11 at the predetermined measurement position by using the LCX 13 as an antenna and actually measures the strength of the signal for example, the received electric field strength. After this process, the control section 21 stores the received electric field strength actually measured in step S3 in the memory (storage section 22) as the current day's data in order and checks the current day's data against the previous day's data stored in the memory in step S4. In step S5, the control section 21 determines whether the absolute value of the difference between the current day's data and the previous day's data that are obtained at the same measurement position is equal to or greater than the predetermined threshold value. When the absolute value of the difference is less than the threshold value, the previous day's data is overwritten with the current day's data in the memory for the next day's measurement in step S6 and the process goes back to step S1 to measure the received electric field strength at the next measurement position. On the other hand, when the absolute value of the difference is equal to or greater than the threshold value in step S5, it is expected that a failure occurs in the ground facility (the base station 11 and the LCX 13 connected to the base station 11) related to the measurement position. In this case, the control section 21 sets a failure temporary flag provided in the memory for each measurement position in step S7 and transmits the failure temporary flag to the central control device 14 via the adjacent base station 11 as the temporary failure determination result in step S8. The reason that the failure temporary flag is transmitted via the adjacent base station 11 is because there is a high possibility that the temporary failure determination result cannot be transmitted because it is expected that the failure occurs in the base station 11 installed at the measurement position. Further, the failure temporary flag transmitted to the central control device 14 includes information indicating the measurement position. After this process, when it is confirmed that the failure temporary flag is transmitted to the central control device 14, the control section 21 resets the failure temporary flag in step S9 and the process goes back to step S1 to measure the received electric field strength at the next measurement position. Thus, in the temporary failure determination process, when it is determined by the train 2 side that the failure occurs in the base station 11 or the LCX 13, information indicating that the failure occurs in the base station 11 or the LCX 13 is transmitted to the central control device 14 on the ground.

Figure 7:
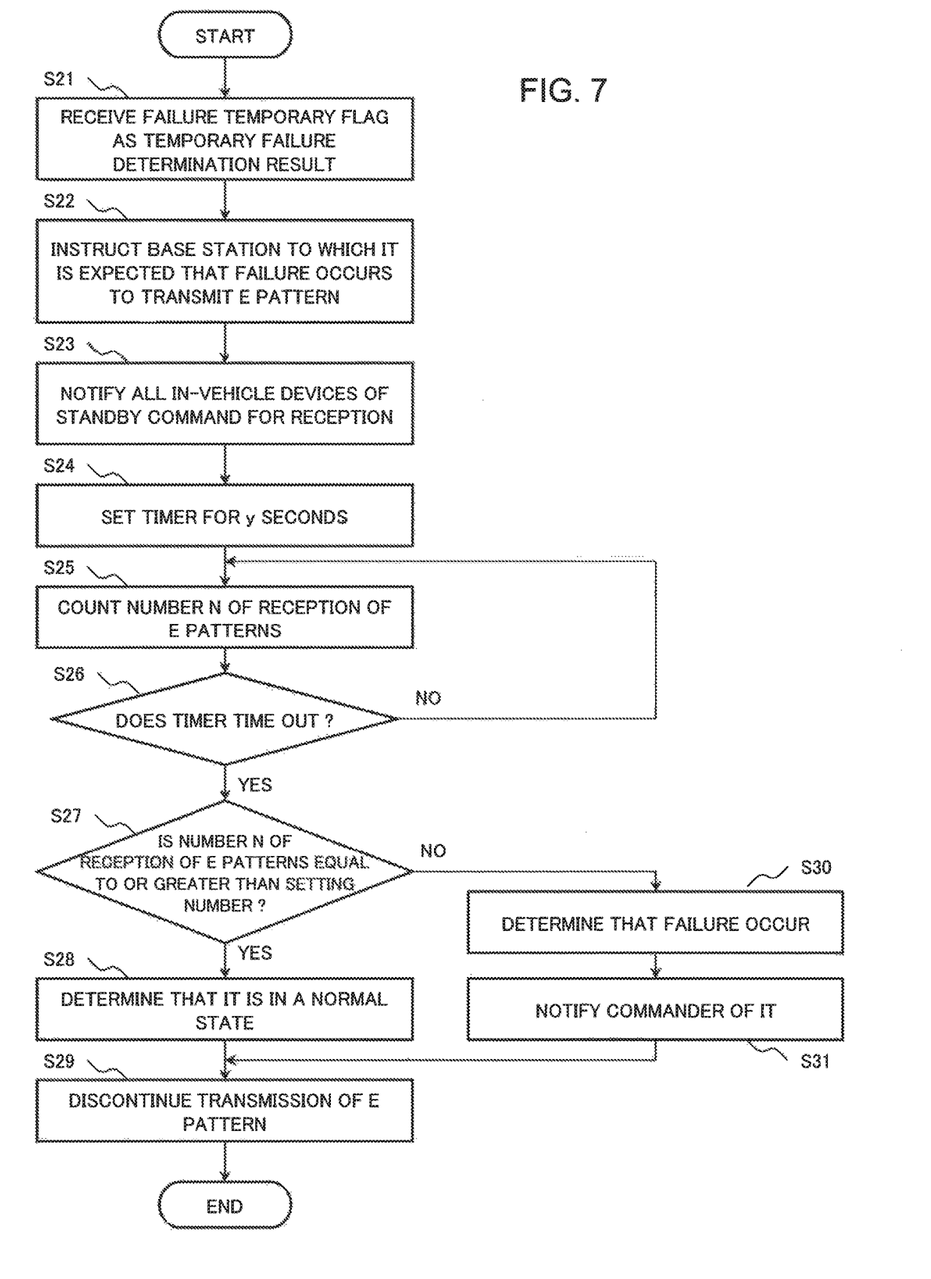
FIG. 7 is a flowchart explaining a process in a ground facility.

The final failure determination process will be described by using FIG. 7. FIG. 7 is a flowchart showing the final failure determination process performed by the central control device 14. When the failure temporary flag is received as the temporary failure determination result in step S21, the central control device 14 determines the measurement position related to the received failure temporary flag. In step S22, the central processing unit 14 instructs the base station related to the measurement position (the base station itself or the base station connected to the antenna to which it is expected that the failure occurs) to transmit an emergency fixed pattern (hereinafter, referred to as "E pattern") as the announcement information. In step 23, a standby command to the reception of the E pattern is transmitted to the in-vehicle device 20 of all the trains 2 which are operated on the route 1 or which exist in a rail yard or the like and to which the train operation is scheduled. For example, the E pattern is a signal with a particular bit repetition pattern. After this process, in step S24, the central control device 14 sets a timer which specifies a time length in which the final failure determination is made. In an example shown in the figure, a setting time of the timer is y seconds.

When the in-vehicle device 20 of the train 2 receives the E pattern that is the announcement information, it transmits an answer to the reception of the E pattern. The answer is transmitted by continuously transmitting an ACK (acknowledgement (reception acknowledgment)) signal to an arbitrary base station located near the train that travels. Accordingly, in step S25, the central control device 14 counts the number of the received ACK signals and thereby, counts the number N of the reception of the E patterns for each train 2. In step S26, the central control device 14 determines whether the elapsed time reaches y seconds, in other words, it determines whether the timer times out. When the timer does not time out, in order to continuously count the number of the reception of the E patterns, the process goes back to step S25. On the other hand, when the timer times out, in step S27, the central control device 14 determines whether the number N of the reception of the E patterns is equal to or greater than a predetermined setting number. When the number N of the reception of the E patterns is equal to or greater than the predetermined setting number, in step S28, the central control device 14 determines that the base station and the LCX to which it is expected from the temporary failure determination result that the failure occurs can perform communication and are in a normal state. Finally, the central control device 14 determines that no failure occurs. In step S29, the transmission of the E pattern is discontinued and the final failure determination process ends. On the other hand, when the number N of the reception of the E patterns is less than the predetermined setting number in step S27, the central control device 14 determines that the failure actually occurs in the base station or the LCX in step S30 and notifies a commander in the operation command room 16 of information indicating that the failure actually occurs in the base station or the LCX in step S31. In step S29, the transmission of the E pattern is discontinue and the final failure determination process ends.

In the above-mentioned explanation, although the correct position of the train 2 is determined by using the GPS satellite 17, when there is a tunnel or the like on the route 1, the GPS satellite 17 is not available in the tunnel. In such case, after the position of the train 2 is determined at the place at which the GPS satellite 17 is available, the position of the train 2 can be determined by performing an accumulation of information about a train speed and the like. When an area in which the GPS satellite is not available is small, the position of the train 2 can be determined with a high degree of accuracy even when the accumulation of the information about a train speed is used.

The example embodiment of the present invention has been described above. Originally, the LCX is used as a countermeasure against dead zone in the tunnel. Therefore, many LCXs are installed in the tunnel. However, in recent years, the LCX is widely installed on a soundproof wall outside the tunnel that is arranged in parallel to the train tracks. Interference between the LCX and a metal material such as a shield plate or the like of which constitutes the soundproof wall may occur by an earthquake, strong wind, snowfall, or the like. Even when a phenomenon in which the received electric field strength measured in the train is reduced to a very small value by such interference occurs, by using the above-mentioned method, the fault can be detected and the fault location can be identified with respect to the fault which occurs by such interference in addition to the failure in the LCX itself.

Further, in each example embodiment mentioned above, the mobile communication system which performs wireless communication with the mobile body which travels on the route is described. Further, an object of each example embodiment is to provide a mobile communication system which can make a failure determination during the operation of the mobile communication system while maintaining the operation of the mobile body on the route without performing an on-site investigation by an investigator at all the places at which the ground facility is installed, can detect a failure or a fault in the wireless facility, and can identify a fault location. Further, an object of each example embodiment in which the in-vehicle device which is installed in the mobile body which travels on the route and performs wireless communication with the ground facility is described is to provide the in-vehicle device which can be used for detecting a failure or a fault in the ground facility while maintaining the operation of the mobile body on the route and operating the ground facility. Further, in the above-mentioned example embodiments, the control device installed in the mobile communication system which performs wireless communication with the mobile body which travels on the route is described. An object of each example embodiment is to provide the control device which can make a failure determination during the operation of the control device while maintaining the operation of the mobile body on the route without performing the on-site investigation by the investigator at all the places at which the ground facility is installed, can detect a failure or a fault in the ground facility, and can identify a fault location.

The example embodiment of the invention of the present application has been described above with reference to the example embodiment. However, the embodiment to which the invention of the present application can be applied is not limited to the example embodiment mentioned above. Various changes in the configuration or details of the invention of the present application that can be understood by those skilled in the art can be made without departing from the scope of the invention of the present application.

This application claims priority from Japanese Patent Application No. 2014-103152, filed on May 19, 2014, and the disclosure of which is hereby incorporated by reference in its entirety.

REFERENCE SIGNS LIST 1 route
2 train
11 base station
12 coaxial cable
13 leaky coaxial cable (LCX)
14 central control device
15 signal cable
16 operation command room
17 GPS satellite
20 in-vehicle device
21 control section
22 storage section
23 strength measurement block
24 temporary failure determination block
25 announcement information transmission block
26 base station control unit
27 announcement information transmission unit
28 final information determination unit
31, 32, and 61 antenna
33 antenna duplexer
34 signal processing-calculating unit
35 control unit
36 external interface
37 power supply unit
38 operation unit
39 indicator
41 to 43 and 47 to 49 bandpass filter
44 D/A converter
45 and 46 A/D converter
51 to 53 mixer
62 GPS receiver
100 and 200 mobile communication system

What is claimed is:

1. A fault detection method used for detecting a failure location of a wireless facility, the wireless facility including at least one base station installed in each of a plurality of sections of a route and an antenna connected to each of the at least one base station, and a control device that controls each base station installed beside the route and performing wireless communication with at least one mobile body that travels along the route, comprising:

measuring a strength of a signal, by one of the at least one mobile body in operation, emitted from a first antenna connected to one of the at least one base station and acquiring a temporary failure determination result based on the signal strength;

transmitting announcement information by the control device via a first base station connected to the first antenna and the first antenna that are determined to be failed in response to the temporary failure determination result is acquired;

transmitting an answer to the control device by at least one arbitrary mobile body in operation that received the announcement information; and making a final failure determination based on the answer transmitted from the at least one arbitrary mobile body.

2. The fault detection method according to claim 1 in which the final failure determination is made based on number of the answers indicating normal reception of the announcement information.

3. The fault detection method according to claim 2, wherein when the strength of the signal is measured in a in-vehicle device of the mobile body, the in-vehicle device stores a measurement result in a storage device for each measurement position, and wherein the in-vehicle device makes the temporary failure determination by comparing a past measurement result stored in the storage device with a latest measurement result for each measurement position.

4. The fault detection method according to claim 2, wherein the announcement information comprises a repetition of a particular pattern or a repetition of a particular bit string, and wherein the final failure determination is made by tallying whether or not at least one response to the announcement information is received from the at least one arbitrary mobile body in operation.

5. The fault detection method according to claim 1, wherein when the strength of the signal is measured in a in-vehicle device of the mobile body, the in-vehicle device stores a measurement result in a storage unit for each measurement position, and wherein the in-vehicle device makes the temporary failure determination by comparing a past measurement result stored in the storage unit with a latest measurement result for each measurement position.

6. The fault detection method according to claim 5, wherein the past measurement result is a previous day's measurement result and when difference between the past measurement result and the latest measurement result is equal to or greater than a predetermined threshold value for each measurement position, the temporary failure determination is made.

7. The fault detection method according to claim 1, wherein the announcement information comprises a repetition of a particular pattern or a repetition of a particular bit string, and
  wherein the final failure determination is made by tallying whether or not at least one response to the announcement information is received from the at least one arbitrary mobile body in operation.

8. The fault detection method according to claim 1, wherein the temporary failure is determined, by a first mobile body, based on the measurement of strength of the signal measured at a predetermined location; and
  position of the first mobile body is determined by using a satellite positioning system.

9. The fault detection method according to claim 1, wherein the route is a railroad track, the mobile body is a train, and the temporary failure determination and the final failure determination are made during a commercial operation of the train.

10. A mobile communication system performing wireless communication with at least one mobile body that travels along a route, the mobile communication system including:
  a ground facility comprising at least one base station installed in each of a plurality of sections of the route and an antenna connected to each of the at least one base station, and a control device which controls each base station installed beside the route; and
  an in-vehicle device installed in each mobile body,
  wherein the in-vehicle device includes a controller that measures a strength of a signal emitted from a first antenna connected to one of the at least one base station, makes a temporary failure determination based on the signal strength, and transmits a determination result to the control device, and
  wherein when the control device receives the temporary failure determination result, the control device transmits announcement information via a first base station connected to the first antenna and the first antenna that are determined to be failed and makes a final failure determination based on answer transmitted from at least one arbitrary mobile body in operation that received the announcement information.

11. The mobile communication system according to claim 10, wherein the control device makes the final failure determination based on number of the answers indicating normal reception of the announcement information.

12. The mobile communication system according to claim 11,
  the in-vehicle device further including a storage device, wherein
  the controller stores a measurement result in a storage device for each measurement position when the strength of the signal is measured and make the temporary failure determination by comparing a past measurement result stored in the storage device with a latest measurement result for each measurement position.

13. The mobile communication system according to claim 11,
  wherein a repetition of a particular pattern or a repetition of a particular bit string is used for the announcement information, and
  wherein the final failure determination is made by tallying whether or not at least one response to the announcement information is received from the at least one arbitrary mobile body in operation.

14. The mobile communication system according to claim 11, wherein
  the in-vehicle device includes a receiver that receives a radio wave from a positioning satellite, determines the position of the mobile body and measures the strength of the signal at a predetermined position based on the position of the mobile body that is determined by the receiver.

15. The mobile communication system according to claim 10,
  the in-vehicle device further including a storage device, wherein
  the controller stores a measurement result in a storage device for each measurement position when the strength of the signal is measured and make the temporary failure determination by comparing a past measurement result stored in the storage device with a latest measurement result for each measurement position.

16. The mobile communication system according to claim 15,
  wherein the past measurement result is a previous day's measurement result and when difference between the past measurement result and the latest measurement result is equal to or greater than a predetermined threshold value for each measurement position, the temporary failure determination is made.

17. The mobile communication system according claim 10, wherein a repetition of a particular pattern or a repetition of a particular bit string is used for the announcement information, and
  wherein the final failure determination is made by tallying whether or not at least one response to the announcement information is received from the at least one arbitrary mobile body in operation.

18. The mobile communication system according to claim 10, wherein
  the in-vehicle device includes a receiver that receives a radio wave from a positioning satellite, determines a position of the mobile body and measures the strength of the signal at a predetermined position based on the position of the mobile body that is determined by the receiver.

19. The mobile communication system according to claim 10, wherein the route is a railroad track and the mobile body is a train.

20. An in-vehicle device installed in a mobile body which travels on a route which performs wireless communication with a ground facility comprising a base station installed in each of a plurality of sections of the route 10 and an antenna connected to the base station wherein each base station installed beside the route is controlled by a control device, comprising:
  a strength measurement circuitry that measures a strength of the signal emitted from the antenna,
  a temporary failure determination circuitry that makes a temporary failure determination based on the strength of the signal and transmitting a determination result to the control device, and
  an announcement information transmitter that transmits an answer to the control device in response to a announcement information is received via the base station and the antenna.

* * * * *